United States Patent Office 2,857,244
Patented Oct. 21, 1958

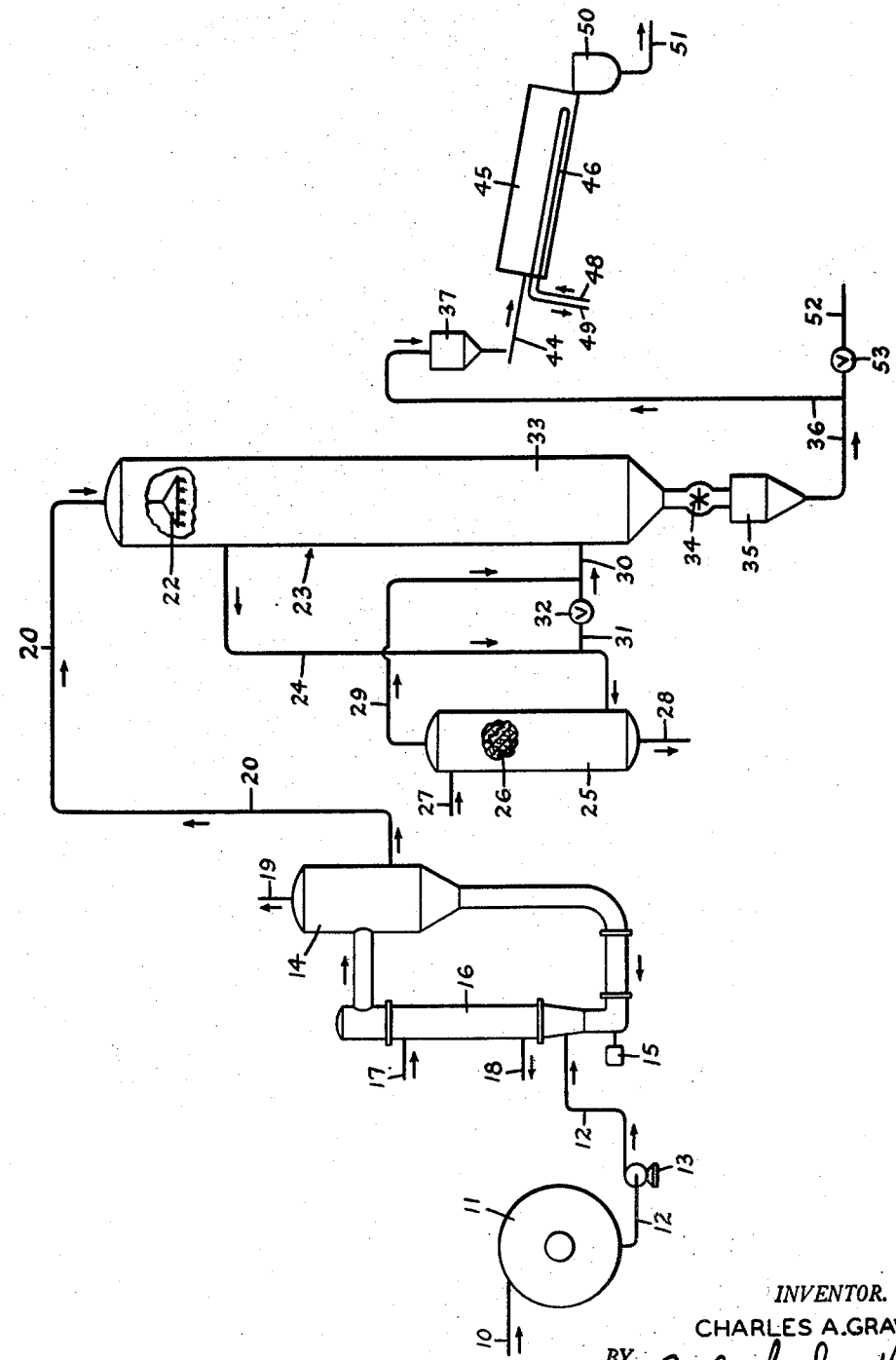

2,857,244

PROCESS FOR THE MANUFACTURE OF HIGH-DENSITY, ANHYDROUS CALCIUM CHLORIDE

Charles A. Graves, New Woodstock, N. Y., assignor to Allied Chemical Corporation, New York, N. Y., a corporation of New York Application January 3, 1955, Serial No. 479,530

10 Claims. (Cl. 23—90)

This invention relates to a new process for manufacturing high bulk-density, solid, anhydrous calcium chloride characterized by freedom from dust and fines, improved flow qualities, and by high rate and great depth of ice penetration.

Manufacture of calcium chloride in typical commercial operations may involve treatment of a charge solution obtained from one of the following three sources: (1) waste liquor from the ammonia-soda process; (2) liquor obtained by the neutralization of hydrochloric acid with lime or limestone; or (3) natural brine liquors. In each case, the calcium chloride is first present in more or less dilute aqueous solution, which upon being concentrated to ca. 73%–78%, will precipitate crystals of the dihydrate ($CaCl_2.2H_2O$) on being cooled. These crystals find use for example as a dehydrating agent, in dressing roads, in melting ice, etc.; and when dissolved in aqueous solution, as a refrigerant solution, an anti-freeze, etc.

Although calcium chloride in the form of dihydrate crystals is suitable for these and many other purposes, it is characterized by several disadvantages, among which is the high water content, i. e. to the extent of about one quarter of the total weight. In addition to the extra cost of shipping and storing this water, packaging is affected to the extent that the standard sized containers will weigh proportionately more. Dihydrate crystals moreover are readily deliquescent under normal conditions and absorb moisture in quantity to permit dissolution of crystal in the absorbed water, at at least to such an extent that they become superficially moist with possibility of formation of large agglomerates of crystals. Handling of these agglomerates presents problems where the crystals are to be employed in dry form.

Many disadvantages inherent in the 73%–78% dihydrate crystals may be eliminated by removal of the water of crystallization. When pure dihydrate crystals are heated at atmospheric pressure under certain controlled conditions, water is liberated until the temperature rises to 235° C. at which point the last portion of water is lost to yield the anhydrous salt. According to older commercial practice, where the charge is a dilute solution of calcium chloride, it is customary to evaporate the water therefrom in open, cast-iron pots heated by e. g. a gas flame. The heat input must be constantly regulated to effect proper control as the temperature of the batch rises. After the proper time, the heat input is adjusted so that the temperature is gradually raised to at least 235° C. In practice, higher temperatures have been customarily employed due to heat losses and difficulties of heat transfer. The last quantity of water of crystalization is driven off and anhydrous product is obtained in the pot as a solid slab which may be broken up as by preliminary hammering and subsequent pulverizing. Reduction of the slab to suitable particulate form by crushing, disadvantageously yields a heterogeneous mass containing a wide variety of particle sizes together with an inordinate amount of fines.

Alternatively the anhydrous product may be formed from the essentially dihydrate starting material by heating the latter in a rotary kiln without however producing a product of high density. Other methods of production of the anhydrous material include admission of concentrated solution into the center of a moving bed of semi-anhydrous particles maintained within a rotary kiln. All rotary kiln methods are subject to the disadvantage of low thermal efficiencies.

The anhydrous calcium chloride from drying operations heretofore employed e. g. kiln-drying is characterized by wide range of particulate sizes, typically downwardly from the desired size of e. g. as largt as 0.75″ to fine powder. Presence of large amounts of generated fines, which must be separated and recycled to the kiln or to other parts of the system, is customary and is particularly undesirable. High bulk density particles or pellets are obtained with difficulty, it at all, and only upon observance of exacting conditions of precise control. In addition to these disadvantages, many anhydrous products are characterized by very low resistance to deliquesence and can be maintained anhydrous only with difficulty. When the product is used to melt ice, the above factors contribute to undesirably low depth and low rate of ice penetration.

The object of this invention is to manufacture anhydrous calcium chloride of high bulk-density, high ice penetration, and improved flow quality. A second object of this invention is to manufacture particles of anhydrous calcium chloride free of dust and fines. Other objects of this invention will be apparent to those skilled in the art on inspection of the following description and the accompanying drawing which represents a schematic flow sheet of one embodiment of this invention.

In practice of the invention, an aqueous calcium chloride solution of low or intermediate concentration is subjected to evaporation at temperature of at least about 200° C. to below that at which calcium chloride monohydrate is dehydrated, and under superatmospheric pressure adequate to maintain a liquid phase at the selected evaporation temperature, until a freezable, flowable (preferably pumpable) slurry of calcium chloride monohydrate in calcium chloride solution is formed. This slurry is then cooled until frozen while maintaining it under sufficient superatmospheric pressure such that the boiling point of the liquid content of the slurry is above ambient cooling temperatures achieved. In practice of the cooling and freezing step of the invention, in order to attain high density product, boiling of water with resultant concentration of calcium chloride is and must be suppressed. We have found that freezing the hot slurry at atmospheric pressure or other conditions which permit boiilng of liquid content of slurry, results in undesired low density product. In the freezing step of the invention, boiling of such liquid is prevented and loss of water, if any, which occurs is superficial evaporation inevitably incidental to contact of wet surfaces with gas. In some modes of practice of the invention, very little to substantially no surface of the slurry is so exposed and no appreciable evaporation occurs.

By one method of practice of the invention, the slurry is divided into desired granular or grain forming condition, such as agglomerates, particles, or pellets of desired size, prior to or during the superatmospheric pressure freezing step. In this event, the slurry resulting from the evaporation step may be discharged into cooled casting molds of desired size while maintaining it during freezing at an appropriate pressure above its vapor pressure, or it may be discharged through suitably sized nozzles into the upper portion of a prilling or shot tower to form globules or pellets while being maintained in contact with pressurized cooling gas, for example, steam, air, or mixtures thereof. By another mode of practice of the invention, the slurry may be formed in sheets of suitable thickness, for example between cooled spaced moving surfaces provided by suitably matched endless belts or between a belt and a drum while being subjected to a pressurized freezing process. According to this method, the surfaces exposed to pressurized gas, and consequently, incidental evaporation, are at a minimum. The sheet material is thereafter reduced to desired grain or particulate form, for example, by the known use of suitably spaced breaking rolls.

Whichever of the modes of practice is followed in producing granular product from the slurry, the grains produced are of high bulk-density, are remarkably tough and free of fines and of tendency to produce fines by attrition, and are of permanent shape which resists rolling, making them eminently suitable for predetermined distribution over and retention on iced surfaces. Moreover, they have highly desirable ice melting characteristics.

In preferred practice of the invention, the grained material described hereinabove is subjected to dehydration to form a product containing anhydrous calcium chloride which has markedly superior ice melting properties. When conducted, the dehydration step is at increasing temperature over a temperature range from not above about 175° C. to about 235° C. or higher. Low dehydration temperatures, preferably not above about 175° C., are employed until dihydrate present is decomposed and substantially monohydrate is obtained, i. e. until the grains have a water content of about 15%. Thereafter, temperature of the grains is increased to about 235° C. or higher to effect decomposition of the monohydrate and evaporation to desired extent, preferably to substantially complete elimination of water. In the interest of economy of shipment and of developing to maximum extent the ice-melting efficiency of the final product, it is preferred that this dehydration be conducted until the grains consist of substantially anhydrous calcium chloride.

It is characteristic of the novel grained products obtained during the final dehydration step, when employed, that they are of high bulk-density. During dehydration they undergo substantially no disintegration to powder. By way of illustration, rough-contoured generally cubical, block-like grains of about ⅛ inch on each side, which were obtained by breaking a sheet of that thickness prepared by pressurized freezing without boiling or flashing of water from an about 82% calcium chloride content slurry, where substantially free of powder as crushed. Upon being substantially completely dehydrated in a rotary drum and being maintained in the drum at dehydration temperature for upwards of 12 hours after the dehydration was complete, they produced by attrition less than 4% powder, despite their being of rough configuration conducive to formation of powder. The dehydrated grains had bulk-density of about 0.98 kilogram per liter.

Generally speaking, the dehydrated grained material regardless of the method of preparation has bulk-density of 0.92 to 1.0, high resistance to deliquescence, and to dusting by attrition or otherwise. The individual grains are substantially non-porous and substantially homogeneous physically and chemically. Although they are free-flowing, they are of irregular shape which permits them to stay substantially where originally placed upon uneven or sloped icy surfaces. They possess markedly and surprisingly superior ice penetrating and melting efficiency as measured by depth and rate of ice penetration by individual particles.

In the accompanying drawing, which sets forth one method of producing the desired product of this invention, an aqueous solution of calcium chloride is passed from earlier stages of evaporation through line 10 to the last stage 11 of the evaporator or concentrator.

Liquor withdrawn from vessel 11 through line 12 may be at a concentration of 68%–73% by weight of calcium chloride in aqueous solution, say 70% calcium chloride. It is pumped as by pump 13 through line 12 to evaporator generally designated 14. In this evaporator, which may be of the forced circulation type having pump 15 and external indirect heat exchanger 16 heated by steam entering through line 17 and leaving through line 18, aqueous calcium chloride solution is concentrated under pressure adequate to maintain a liquid phase at the desired evaporation temperature. Preferably the solution is heated to a temperature which is at least about 200° C. and is less than about 235° C., while maintaining pressure in the range of 5 p. s. i. g.–25 p. s. i. g. Under typical conditions of operation final temperature of heating may be 210° C.–215° C. at 20 p. s. i. g. Under these conditions, the concentrating aqueous calcium chloride is preferably maintained under agitation, as by being circulated through the component parts of evaporator 14 while being heated as by steam in heat exchanger 16. Water is evaporated and withdrawn through line 19. The resultant mixture in evaporator 14 is raised to a concentration of at least 80% and up to about 84% typically about 82%, calcium chloride on an overall basis. It will be understood that although this concentration closely approaches 85.5%, that corresponding to pure calcium chloride monohydrate, in practice of this invention the concentration step is terminated at a point at which there is obtained a flowable, preferably pumpable, slurry which is composed of solid calcium chloride monohydrate in liquor of higher water content. In the typical 82% slurry, the bulk of the calcium chloride present, e. g. 60% to 67%, is in the solid monohydrate form. This slurry, at 200° C. or slightly higher, say 215° C., is pumped or passed under the pressure of evaporation or at somewhat higher pressure through line 20 and into a pressurized cooling zone for freezing the slurry without substantial reduction in its water content. This zone may provide a suitably cooled device (not shown), for example, a water cooled drum or water cooled parallel stainless steel belts, enclosed in a pressure-tight housing, adapted to receive the slurry and freeze the same to sheet form. Such a device is preferably followed by a suitable graining machine, for example, spaced rotating drums which in known manner break up the relatively large sheet form frozen material.

The pressurized cooling step may be effected until the calcium chloride compound is at any desired temperature at which it exists in substantially homogeneous solid form; i. e. to somewhat below the evaporation temperatures previously attained. In the event the freezing step is to be followed by further dehydration, it is preferred, in the interest of economy, that cooling terminate with temperature not below about 150° C., for example, from 150° to 165° C.

As illustrated in the drawing, the slurry of calcium chloride monohydrate may be sprayed into suitably pressurized shot or prilling tower 23 through nozzle 22 containing a plurality of orifices of 0.0625 to 0.125 inch diameter. The downwardly descending material in the form of suitably sized droplets is contacted with upwardly ascending cooling gas, for example, steam, air, or mixtures thereof, admitted through line 30 at the bottom of tower 23. The prilling tower is at pressure sufficiently high that the boiling point of liquid in the slurry is above ambient slurry temperature, and typically is within the range of 15 to 30 p. s. i. g. Entering air is at temperature which is below that of the freezing temperature of the sprayed slurry, for example 25° C. to 100° C. below that temperature. Typical entering temperature would be within the range of 75° C. to 150° C. In preferred practice the frozen grains as withdrawn from the tower are at temperature but slightly below, say up to 10° C. lower than the freezing point of the slurry. At the very short retention times within the tower incidental superficial evaporation of water is easily kept to very low or minimal values. As the globules or droplets fall and are cooled, they freeze in elongated irregular shape before reaching the bottom of the tower, whence they are withdrawn through valve 34.

Optionally a fluidized bed (not shown) of these formed particles may be maintained in the lower portion 33 of tower 23 to insure freezing of all internal portions of the pelleted material, in which case the height of the tower may be decreased. Under these conditions of operation, cooling air passed subsequently through the tower is preferably used as the fluidizing gas, or supplementary air or steam may be provided for this purpose.

Air used to freeze the descending stream of calcium chloride monohydrate is withdrawn through line 24 and may typically be at temperature of 100° C. to 195° C., and passed to cooling tower 25 which may be packed with inert packing 26. Cooling may be and preferably is effected by spraying cold water over the packing from line 27 and removing the same through line 28. Air which is cooled is removed from tower 25 through line 29 and returned to spray tower 23 through lines 29 and 30. Control of the amount of cooling of the air in line 24 may be effected by opening or closing by-pass valve 32 in line 31. If by-pass valve 32 were closed completely, all of the air in line 24 from the top of tower 23 would be recirculated directly through tower 25 wherein it would be cooled before being recirculated to tower 23. As valve 32 is opened, at least a portion of this air in line 24 passes through line 31 to line 30 and to tower 23, thus by-passing cooler 25.

Grained material of substantially elongated irregular shape having composition corresponding substantially to that of the slurry, collects in the bottom of tower 23 or such other graining device as may have been used, and is withdrawn therefrom through rotary discharge valve 34 or optional lock-out bins (not shown), to temporary storage hopper 35. If desired, the grains may be withdrawn from line 36 through valve 53 in line 52 and may be of 16 to 8 mesh and have a bulk density of 1.2 to 1.3. Typically the uncalcined grains are free of internal voids, physically homogeneous, of high strength, and of roughly uniform size and shape which are permanently retained during the subsequent dehydration. Pellets collected in hopper 35 may be withdrawn therefrom and passed through line 36 to temporary storage hopper 37, from which they may be passed directly to vibrating feed chute 44 and thence to kiln 45 which may be of the rotary drum type.

As alternative to the prilling tower 23, the freezing of slurry may be accomplished between cooled moving surfaces. In one embodiment of this particular alternative, an internally cooled drum was fitted with a 0.125 inch thick steel rim or band upstanding from each end thereof. A stainless steel moving belt passing between pulleys which held the same against the steel band, provided a one-eighth inch deep annular space or pocket between it and the cooled drum extending over the drum area between the rim portions engaged by the belt. The latter was also cooled, and the drum and belt assembly was enclosed within a pressurized housing.

In operation of this embodiment, charge slurry, of concentration hereinbefore noted, e. g. 82% as prepared in evaporator 14, was admitted to the pocket at rate to keep it filled. The calcium chloride slurry is frozen within this space by cooling means within the drum and by water sprayed onto the outer surface of the belt. The frozen calcium chloride monohydrate-containing slurry, in the form of a sheet ca. 0.125" thick and ca. 7" wide, which is non-adherent to belt or drum was broken to curved strips ca. 3 inches wide by a doctor blade. The steel belt was dried before returning to the point of admission of the slurry.

The 3" x 7" x 0.125" curved strip was broken to pass a 4 mesh screen with attendant production of as little as only 5.6% fines passing through 20 mesh. Upon being dried as in kiln 45, it had bulk density of 0.981. After a 10 hour tumbling test of the material retained on 20 mesh, it was found to have formed only about 4.1% fines less than 20 mesh. This block-like more-or-less cubical form material, substantially identical in properties to the prilling tower pellets, is desirably suited for use in ice melting.

As another embodiment of this invention, the pressurized slurry may be frozen by passing between two generally flat, cooled, endless belts one of which has upturned or built-up sides which engage the other over the area in which the pocket or space between the belts is maintained full of slurry in liquid and frozen forms, to form a flat sheet having properties substantially identical to the sheet produced as above-noted, which may be broken to form the desirably sized pellets.

It will be noted that when the monohydrate-containing solid is obtained in pressurized environment, this material (and the anhydrous product formed therefrom) has the noted properties regardless of whether or not the particulation or separation of slurry into discrete grains occurs before, during, or after the freezing of solidification. The solidified slurry obtained at this point will be referred to as grained or of grain-form, it being understood that these terms are intended to apply to the material obtained from the prilling tower, the drum freezer, or the belt freezer.

It has been discovered that by dehydration wherein the grains are initially heated preferably to a temperature of about 5° C. to 20° C., say 10° C. lower than the melting point of the dihydrate, for example at 155° C.–170° C., say 160° C. and then gradually raised to 235° C. or above, the granulated charge to kiln 45 will undergo dehydration to a high bulk-density substantially anhydrous final product without substantial modification of particle size or shape. Simultaneously a stream of air or other gas is preferably passed through or over the bed of dehydrating material to achieve desirable rapid removal of water from the system. In practice of this preferred method of effecting the calcination phase of the invention, over a substantial portion of drying time the material in dehydrating and dehydrated condition is maintained at substantially below the melting point of calcium chloride dihydrate until dehydration of the dihydrate to the monohydrate is virtually completed, and then at above 235° C. as up to 300° C. until dehydration of the monohydrate is completed. For convenience, the heat for both stages may be supplied as schematically shown, by closed steam coils 46 embedded in the dehydrating material in rotary kiln 45 which are fed with steam at pressure of about 450 p. s. i. g.–500 p. s. i. g., admitted through line 48, condensate being removed through line 49. Surprisingly in preferred practice of this dehydration step, there is no sticking or fusing of individual grains undergoing dehydration and little or no chipping, attrition, powdering, or other action resulting in production of undesirable oversized or undersized material.

The substantially anhydrous calcium chloride prepared by preferred practice of this invention has unique physical form and properties. The bulk-density of the material is high in comparison to anhydrous material made by other processes. It may be as high as 0.9 to 1.0, and typically will be of the order of 0.95–0.98. The individual particles are homogeneous chemically and physically and are characterized by substantial absence of macroscopic internal voids. In shape they are irregular and do not roll. This is a significant factor to be considered for use of the same as a melting agent for ice.

The individual grains are characterized by high general strength, high resistance to crushing and shearing forces, and low tendency to powder or to dust. The mass of particles is substantially uniform in size, i. e. less than 10% of the grains are greater or less than the desired range of e. g. 8–20 mesh.

Because of the high density and the other properties listed, this new anhydrous calcium chloride is desirably suited for use in melting ice. In one series of tests, this new product (as prepared in a prilling tower) was compared with commercially available anhydrous pellets and with ordinary 78% calcium chloride flake. Results in terms of penetration at —23° C. during median pellet life and time to effect the same, are shown in the following table (all particles being approximately the same mesh size of about 6–8 mesh):

*Penetration*

|  | Depth in Sixteenths of an Inch | Median Pellet Life Time, Minutes | Rate Sixteenths Inch per Minute |
| --- | --- | --- | --- |
| New Products | 6–7 | 14–19 | 0.37–0.43 |
| Commercial Anhydrous Spherical Pellets | 6–7 | 21–22 | 0.28–0.32 |
| Commercial 78% Flake | 2–2.5 | 25 | 0.08–0.1 |

The last column indicates that the rate of penetration of the new product may be more than five times that of other standard products now available, and that the range of rates of the new product is wholly different from and superior to the range of rates of the products heretofore known. From this table it also is apparent that the new anhydrous product is at least three times as effective as the 78% product in that the former will penetrate three times as far into the ice in shorter time. It is more effective than the presently available commercial anhydrous material in that it will accomplish the desired result in about three-quarters or less the time required for that product.

I claim:

1. A process of preparing high bulk-density, solid, dehydrated calcium chloride which comprises evaporating an aqueous calcium chloride solution to expel a portion of the water therefrom at a temperature of at least about 200° C. and below that temperature at which calcium chloride monohydrate dehydrates, and under superatmospheric pressure sufficient to maintain a liquid phase at the evaporation temperature within the range of 5 p. s. i. g.–25 p. s. i. g., effecting the evaporating as aforesaid until a flowable slurry of solid calcium chloride monohydrate in calcium chloride solution is formed, said slurry having an overall composition approximating that of calcium chloride monohydrate, and cooling said slurry until solidified under superatmospheric pressure at least that employed during the aforesaid evaporating thereby to obtain a high bulk-density, solid, dehydrated calcium chloride.

2. A process of preparing high bulk-density solid, dehydrated calcium chloride which comprises evaporating an aqueous calcium chloride solution to expel a substantial portion of the water therefrom at a temperature of about 200°–235° C. and under superatmospheric pressure sufficient to maintain a liquid phase at the evaporation temperature within the range of 5 p. s. i. g.–25 p. s. i. g., effecting the evaporating as aforesaid until a flowable slurry of solid calcium chloride monohydrate in calcium chloride solution is formed, said slurry having an overall composition closely approaching that of calcium chloride monohydrate and containing about 80–84% of calcium chloride, and cooling said slurry until solidified under superatmospheric pressure at least that employed during the aforesaid evaporating thereby to obtain a high bulk-density, solid, dehydrated calcium chloride.

3. The process of claim 2 wherein the flowable slurry is first solidified by cooling and then formed into grains.

4. The process of claim 2 wherein the flowable slurry is formed into grain-sized droplets and the droplets are solidified by cooling to yield solid grains.

5. A process of preparing high bulk-density, solid, grain form, anhydrous calcium chloride characterized by high rate of grain penetration into ice when melting the ice, which comprises evaporating an aqueous calcium chloride solution to expel a substantial portion of the water therefrom at a temperature of at least about 200° C. and below that temperature at which calcium chloride monohydrate dehydrates, and under superatmospheric pressure sufficient to maintain a liquid phase at the evaporation temperature within the range of 5 p. s. i. g.–25 p. s. i. g., effecting the evaporating as aforesaid until a flowable slurry of solid calcium chloride monohydrate in calcium chloride solution is formed, said slurry having an overall composition closely approaching that of calcium chloride monohydrate and containing about 80–84% of calcium chloride, cooling said slurry until solidified under superatmospheric pressure at least that employed during the aforesaid evaporating, and dehydrating the solidified slurry in grain form to yield a high bulk-density, solid, grain form, anhydrous calcium chloride.

6. A process of preparing high bulk-density, solid, grain form, anhydrous calcium chloride characterized by high rate of grain penetration into ice when melting the ice, which comprises heating an aqueous calcium chloride solution to evaporate a substantial portion of the water therefrom at a temperature of at least about 200° C. and below that temperature at which calcium chloride monohydrate dehydrates, and under superatmospheric pressure sufficient to maintain a liquid phase at the evaporation temperature within the range of 5 p. s. i. g.–25 p. s. i. g., effecting the heating and evaporating as aforesaid until a flowable slurry of solid calcium chloride monohydrate in calcium chloride solution is formed, said slurry having an overall composition closely approaching that of calcium chloride monohydrate and containing about 80–84% of calcium chloride, dividing said slurry into a plurality of droplets, solidifying said droplets by contact with cooling gas during downward passage therethrough while under superatmospheric pressure at least that employed during the aforesaid evaporating, and dehydrating the solidified droplets to obtain a high bulk-density, solid, grain form, anhydrous calcium chloride.

7. A process of preparing high bulk-density, solid, grain form, anhydrous calcium chloride characterized by high rate of grain penetration into ice when melting the ice, which comprises heating an aqueous calcium chloride solution to evaporate a substantial portion of the water therefrom at a temperature of about 200°–235° C. and under superatmospheric pressure of 5 p. s. i. g.–25 p. s. i. g., which pressure is sufficient to maintain a liquid phase at the evaporation temperature, effecting the heating and evaporating as aforesaid until a flowable slurry of solid calcium chloride monohydrate in calcium chloride solution is formed, said slurry having an overall composition closely approaching that of calcium chloride monohydrate and containing about 80–84% of calcium chloride, dividing said slurry into a plurality of droplets, cooling said droplets to form solid grains containing calcium chloride monohydrate by contact with cooling gas during downward passage of said droplets through said gas under superatmospheric pressure at least that employed during the aforesaid evaporating, maintaining said solid grains at a temperature within the range of 155°–170° C. for a period sufficient to convert any calcium chloride dihydrate of said grains to calcium chloride monohydrate, and thereafter heating the partially dehydrated solid grains containing calcium chloride monohydrate to a temperature of at least 235° C. to remove the remaining water of hydration therefrom thereby to obtain high bulk-density, solid, anhydrous calcium chloride grains without substantial modification of grain shape and size.

8. A process in accordance with claim 7 wherein said cooling gas is at an entering temperature less than 150° C. and is selected from the group consisting of steam, air and mixtures thereof.

9. A process of preparing high bulk-density, solid, grain form, anhydrous calcium chloride characterized by high rate of grain penetration into ice when melting ice, which comprises heating an aqueous calcium chloride solution to evaporate a substantial portion of the water therefrom at a temperature of from 200°–235° C. and under superatmospheric pressure sufficient to maintain a liquid phase at the evaporation temperature within the range of 5 p. s. i. g.–25 p. s. i. g., effecting the heating and evaporating as aforesaid until a flowable slurry of solid calcium chloride monohydrate in calcium chloride solution is formed, said slurry having an overall composition approaching that of calcium chloride monohydrate and containing about 80–84% of calcium chloride, cooling said slurry until solidified between cooled, spaced, moving surfaces under superatmospheric pressure at least that employed during the aforesaid evaporating to form a sheet containing substantially high bulk-density calcium chloride monohydrate, mechanically breaking said sheet into solid grains of desired size, maintaining said grains at a temperature within the range of 155°–170° C. for a period sufficient to convert any calcium chloride dihydrate of said grains to calcium chloride monohydrate, and thereafter heating the partially dehydrated solid grains containing calcium chloride monohydrate to a temperature of at least 235° C. to remove the remaining water of hydration therefrom thereby to obtain high bulk-density, solid, anhydrous calcium chloride grains without substantial modification of grain shape and size.

10. A process of preparing high bulk-density solid, anhydrous, grain form calcium chloride characterized by high rate of grain penetration into ice when melting the ice, which comprises concentrating an aqueous calcium chloride solution by evaporation to a calcium chloride content of 68–73%, further concentrating the aqueous calcium chloride solution by heating to evaporate a substantial portion of the water therefrom at a temperature of 200°–235° C. and under superatmospheric pressure sufficient to maintain a liquid phase at the evaporation temperature within the range of 5 p. s. i. g.–25 p. s. i. g., effecting the heat evaporating as aforesaid until a flowable slurry of solid calcium chloride monohydrate in calcium chloride solution is formed having an overall composition closely approaching that of calcium chloride monohydrate and containing from about 80–84% of calcium chloride, spraying said slurry in the form of droplets into the upper portion of a vertical contacting zone for downward flow therethrough, introducing cooling air having an entering temperature below 150° C. into the lower portion of said contacting zone for upward flow therethrough, contacting the downwardly moving slurry droplets with said upflowing cooling air in said vertical contacting zone to cool and solidify said droplets to form solid grains containing calcium chloride monohydrate under superatmospheric pressure of 15 to 30 p. s. i. g., heating said solid grains in a kiln at a temperature within the range of 155°–170° C. for a period sufficient to convert any calcium chloride dihydrate of said grains to calcium chloride monohydrate, then heating the partially dehydrated solid grains containing calcium chloride monohydrate in the kiln to a temperature of at least 235° C. to remove the remaining water of hydration therefrom, and simultaneously passing a stream of gas inert with respect to calcium chloride and its hydrates over the dehydrating grains in said kiln to rapidly remove evaporated water therefrom, thereby to obtain high bulk-density, solid, anhydrous calcium chloride grains without substantial modification of grain shape and size.

References Cited in the file of this patent

UNITED STATES PATENTS

| | | |
|---|---|---|
| 1,660,053 | Smith | Feb. 21, 1928 |
| 1,801,000 | Heath | Apr. 14, 1931 |
| 1,877,733 | Martin | Sept. 13, 1932 |
| 1,922,697 | Heath | Aug. 15, 1933 |
| 1,956,138 | Staib | Apr. 24, 1934 |
| 2,034,599 | Van Marle | Mar. 17, 1936 |
| 2,417,772 | Marek | Mar. 18, 1947 |
| 2,556,184 | Hedley | June 12, 1951 |
| 2,646,343 | Bennett | July 21, 1953 |

OTHER REFERENCES

J. W. Mellor's "A Comprehensive Treatise on Inorganic and Theoretical Chem.," vol. 3, 1923 ed., page 703, Longmans, Green and Co., N. Y.

Hinds: "Inorganic Chem.," 1909 ed., page 488. John Wiley and Sons, New York.